(12) United States Patent
Skaja et al.

(10) Patent No.: US 8,653,151 B2
(45) Date of Patent: Feb. 18, 2014

(54) ARTICLES PREPARED USING RECYCLED MATERIALS AND METHODS OF PREPARATION THEREOF

(75) Inventors: Joseph J. Skaja, Englewood, NJ (US); Evan L. Schwartz, Teaneck, NJ (US)

(73) Assignee: Aetrex Worldwide, Inc., Teaneck, NJ (US)

( * ) Notice: Subject to any disclaimer, the term of this patent is extended or adjusted under 35 U.S.C. 154(b) by 897 days.

(21) Appl. No.: 12/679,810

(22) PCT Filed: Sep. 23, 2008

(86) PCT No.: PCT/US2008/077384
§ 371 (c)(1), (2), (4) Date: Jun. 17, 2010

(87) PCT Pub. No.: WO2009/042599
PCT Pub. Date: Apr. 2, 2009

(65) Prior Publication Data
US 2010/0293814 A1 Nov. 25, 2010

Related U.S. Application Data

(60) Provisional application No. 60/975,022, filed on Sep. 25, 2007.

(51) Int. Cl.
*C08J 11/04* (2006.01)

(52) U.S. Cl.
USPC ............... 521/49; 521/40; 521/40.5; 521/41; 525/50; 12/21; 12/146 B; 12/146 BR; 36/25 R; 36/32 R; 36/43; 36/103; 428/143; 428/206; 428/323; 156/245; 264/109; 264/122

(58) Field of Classification Search
USPC ....... 521/40, 40.5, 41, 49; 36/25 R, 32 R, 43, 36/103, DIG. 2; 12/21, 142 R, 146 B, 12/146 BR; 428/143, 206, 323; 264/109, 264/122; 156/245; 524/1; 525/50
See application file for complete search history.

(56) References Cited

U.S. PATENT DOCUMENTS

| 3,901,615 | A  | * | 8/1975 | Ceintrey ......................... 404/20 |
| 5,346,934 | A  | * | 9/1994 | Chriss ............................. 524/11 |
| 2005/0106357 | A1 | * | 5/2005 | Mayade ......................... 428/143 |
| 2005/0126038 | A1 | * | 6/2005 | Skaja et al. .................... 36/25 R |
| 2005/0170766 | A1 |   | 8/2005 | Wang |
| 2006/0130363 | A1 |   | 6/2006 | Hottinger |

FOREIGN PATENT DOCUMENTS

| CN | 101003679 | 7/2007 |
| EP | 1801292 | 6/2007 |
| JP | 2002 301778 | 10/2002 |
| JP | 2002301778 | 10/2002 |
| WO | 0053416 | 9/2000 |
| WO | WO 2006/034807 | 4/2006 |
| WO | WO 2006/066256 | 6/2006 |

OTHER PUBLICATIONS

Office Action from corresponding Chinese application No. 200880117578.8 dated Sep. 19, 2011.
Office Action from corresponding European patent application No. 08834681.2 dated Jun. 11, 2012.
International Search Report from International Patent Application No. PCT/US2008/077384, filed Sep. 23, 2008.

\* cited by examiner

*Primary Examiner* — Frances Tischler
(74) *Attorney, Agent, or Firm* — Shumaker, Loop & Kendrick, LLP

(57) ABSTRACT

The present invention is directed to articles of manufacture having at least a portion prepared using recycled material, including but not limited recycled rubber or other polymeric materials. The articles may incorporate the recycled materials in a granulated form. In specific embodiments, the article comprises an article of footwear (i.e., a shoe). Particularly, all or part of the shoe sole may be formed using the granulated material, the granules specifically being joined together using a binder material, such as a polyurethane, preferably a moisture cure, single component polyurethane binder. The invention further provides methods of preparing articles formed of granulated materials. The inventive methods are characterized by their excellent economic benefits, ease of use, and environmental benefits.

27 Claims, No Drawings

ARTICLES PREPARED USING RECYCLED MATERIALS AND METHODS OF PREPARATION THEREOF

CROSS REFERENCE TO RELATED APPLICATIONS

This application is a national stage application filed under 35 U.S.C. 371 of International Application No. PCT/US2008/077384, filed Sep. 23, 2008, which claims priority from U.S. Provisional Application No. 60/975,022, filed Sep. 25, 2007, each of which is incorporated by reference in its entirety.

FIELD OF THE INVENTION

The present invention relates to materials and articles prepared using recycled materials. In specific embodiments, the present invention is directed to articles of footwear that are at least partially prepared using recycled materials.

BACKGROUND

As the world's natural resources continue to be depleted, it is increasingly important to reuse and recycle products and materials. Recycling not only alleviates the need to store or burn used materials as waste, but it also saves energy by reducing the amount of material that must be harvested from the earth and processed into a useful form. Recycling some materials, such as plastic and rubber, is especially sensible, due to the large quantities consumed globally, their persistence in the environment, and the high costs associated with producing and manufacturing with virgin material. Using recycled materials to make new products can be particularly beneficial.

Previous methods of using recycled materials to manufacture new products suffer from several disadvantages, however. For example, many methods require large inputs of energy, melting and reprocessing, addition of virgin material, undesirable binder materials, highly technical and unforgiving processes, and excessive amounts of binder. As a result of the foregoing deficiencies, previous methods of using recycled materials such as rubber generate manufactured articles having undesirable properties, including low porosity, low traction, and high cost.

Therefore, methods of using recycled materials, including rubber, in new products are needed. In particular, methods using reduced energy, reduced or no virgin material, reduced binder, and low cost equipment requiring a minimum amount of startup capital are desired. In addition, new products made from recycled materials and having versatile properties are desired.

SUMMARY OF THE INVENTION

The present invention provides compositions formed using recycled materials, the compositions themselves being useful for preparing a large variety of articles of manufacture. In certain aspects, the compositions are formed of granulated recycled materials, such as rubber and a wide variety of polymeric materials. The materials for recycling can be used in their ground form to make the articles of manufacture by combining the ground recycled materials with an appropriate binder. The combined granulated recycled material and binder material can be formed into numerous articles, including simple sheets that can themselves be cut or otherwise shaped into further articles. In particular embodiments, the invention is useful for preparing articles of clothing or clothing accessory, particularly footwear (e.g., shoes). In other embodiments, articles of manufacture according to the invention can comprise building materials (e.g., landscaping ties), various surfaces (e.g., walking tracks or other flooring materials), or the like.

In one aspect, the invention provides a composition that can be used to make a variety of articles of manufacture. The composition comprises a granulated recycled material and a binder material. The granulated material can be prepared by grinding one or more polymeric materials to form the granules. Non-limiting examples of materials that may be recycled through granulating for use according to the invention include natural rubber, polyurethane rubbers, butadiene rubber (BR), styrene-butadiene rubber (SBR), chloroprene rubber (CR), ethylene-propylene-diene rubber (EPDM), tire rubber, acrylic rubber, butyl rubber, chlorinated polyethylene, epichlorohydrin, ethylene propylene rubber, hydrogenated nitrile rubber, perfluoro elastomers, polynorbornene rubber, chlorobutyl, chlorosulfonated polyethylene, ethylene acrylic, fluoroelastomers, isoprene rubber, nitrile rubber, polychloroprene, polysulfide rubber, silicone rubber, fluorosilicone rubber, tetra-fluoroethylene/propylene, ethylene-vinyl acetate, polyethylene foam, and polyurethane foam.

The granulated recycled material may take on a variety of different particle shapes and sizes. In some embodiments, granules for use according to the invention have an average size of about 0.1 mm to about 15 mm.

A wide variety of binder materials may also be used according to the invention. In certain embodiments, the binder can be useful to attach together the plurality of granules in a manner such that individual granules are not easily disassociated from the article as a whole. In specific embodiments, the binder can comprise materials, such as polyurethane, latex, silicone, and even thermoplastic binders and water-based binders. In a preferred embodiment, the binder comprises a moisture cure, single component polyurethane, although two component polyurethanes could also be used. Of course, a variety of combinations of binders could be used in the invention.

Compositions according to the invention formed using a combination of recycled granulated materials and binder materials can be characterized by the ability to form a structurally cohesive and structurally sound mass of bound particles using only a relatively small amount of binder material. For example, a composition according to the invention may comprise from about 1% to about 20% by volume of the binder material, based on the overall volume of the composition.

In another aspect, the present invention is directed an article of manufacture. In certain embodiments, the article of manufacture comprises a composition as described herein. Particularly, the article of manufacture may be formed using a combination of different granulated recycled materials and/or a combination of different binder materials.

In one embodiment, the invention is directed to an article of manufacture comprising a plurality of distinct regions displaying distinct properties. Specifically, the article may comprise a first region comprising a first granulated recycled material, the granules being joined together with a first binder material. The article may also comprise a second region comprising a second granulated recycled material, the granules being joined together with a second binder material.

In various embodiments, the granulated recycled material used in each region may be the same or different, and the binder material used in each region may be the same or different. Further, the granulated recycled materials used in each region may have an average size that is the same or different.

In specific embodiments, an article of manufacture according to the present invention is an article of footwear (i.e., a shoe). In one embodiment, the invention provides a shoe comprising an outer wear surface at least partially formed of a composition comprising a granulated recycled material, the granules being joined together with a binder material and forming the outer wear surface. The granulated recycled material can have a grain size ranging from about 0.1 mm to about 15 mm, and the composition can comprise 1% to about 20% by volume of binder material based on the overall volume of the composition. In specific embodiments, individual granules of the granulated recycled material are visually distinguishable in the outer wear surface. In other words, it is apparent that the recycled material was not melted and used to mold a new product.

The shoes of the invention may be characterized by the use of the granulated recycled material, in the granulated form, to make a wear surface. Typically, it would be expected that the granules would be easily worn away due crumbling arising from repeated friction. Surprisingly, the shoes of the present invention are able to withstand common wear and tear to maintain the original shape of the wear surface. In some embodiments, the outer wear surface comprises at least a portion of a shoe upper. In other embodiments, the outer wear surface comprises a shoe sole.

A shoe sole comprising the composition of the invention can include: an outsole forming the outer wear surface and comprising a first granulated recycled material, the granules being bound together by a first binder material; and a midsole comprising a second granulated recycled material, the granules being bound together by a second binder material. The granulated recycled material forming the midsole can be same or a different material from the granulated recycled material forming the outsole. Similarly, the binder material binding the granules in the midsole can be the same or a different from the binder material binding the granules in the outsole. Further, the granulated recycled material forming the midsole can have a grain size that is the same or different from the grain size of the granulated recycled material forming the outsole. Moreover, the midsole and outsole can be bonded together by the first binder material, the second binder material, or both the first and second binder materials, depending upon the extent of curing taking place prior to contacting the material forming the outsole with the material forming the midsole.

A shoe sole according to the invention may also comprise further components. For example, the shoe sole may comprise an insert in one or both of the midsole and outsole. Such insert can, in certain embodiments, include a solid structure, a gas filled cavity, a liquid filled cavity, a gel, or combinations thereof. The use of an insert can impart specific properties or characteristics to the shoe sole (e.g., arch support, resiliency, toughness, rebound, etc)) or may simply reduce the amount of materials needed to prepare the shoe sole.

In another aspect, the invention is also directed to methods of preparing articles of manufacture, particularly shoes and shoe components. In one embodiment, a method of preparing a shoe comprises: combining a granulated recycled material with a binder material such that the binder material coats the individual grains of recycled material; and shaping the combined granulated recycled material and binder material to form at least a portion of the shoe. In other embodiments, further steps may be included, such as first granulating the material to be recycled. Another step that may be included comprises curing the combined granulated recycled material and binder material.

Shaping of the combined materials to form an article of manufacture can take on various embodiments. In one embodiment, the shaping step comprises placing the combined materials in or on a mold. Preferably, the mold is formed of a non-wettable material (e.g., polyethylene, polypropylene, and combinations thereof). The shaping step may particularly comprising forming a shoe sole, a shoe upper, or both.

In a specific embodiment, the invention provides a method of forming a shoe sole comprising a plurality of distinct regions displaying distinct properties. The method can particularly comprise: combining a first granulated recycled material with a first binder material, such that the binder material coats the individual grains of recycled material; shaping the combined first granulated recycled material and first binder material to form a first region; combining a second granulated recycled material with a second binder material, such that the binder material coats the individual grains of recycled material; and shaping the combined second granulated recycled material and second binder material to form a second region. In specific embodiments, the first region comprises a midsole, and the second region comprises an outsole forming an outer wear surface.

Of course, the methods of the invention also extend to articles of manufacture beyond footwear. The methods are particularly beneficial because of the economy of the methods and the environmentally friendly aspects of the methods, which require limited energy input compared to known shoe making methods.

DETAILED DESCRIPTION

The present inventions now will be described more fully hereinafter with reference to the accompanying drawings, in which one, but not all embodiments of the inventions are illustrated. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

The present invention may be characterized by its ability to make use of recycled materials to prepare products of manufacture that are not only useful but can be particularly stylish. Specifically, the recycled materials can be incorporated into the product of manufacture in a manner such that it remains readily apparent that the product is formed of recycled materials. Specifically, materials may be recycled and used in the form of granules.

Recycling is understood to mean processing existing materials (e.g., previously prepared articles of manufacture, scraps from previous production processes, and the like) into new products. Recycling is useful to prevent the waste of potentially useful materials, reduce the consumption of fresh raw materials, reduce energy usage, reduce air pollution (e.g., from incineration) and water pollution (e.g., from landfilling) by reducing the need for "conventional" waste disposal, and lower greenhouse gas emissions as compared to virgin production. Accordingly, as used herein, the word "recycled" or the term "recycled material" is intended to relate to a material that was used in, or was the result of, a previous production process (i.e., was a previously produced article of manufacture or scrap material from a previous production process). A tire is one example of a material that can be recycled and used in the present invention. A recycled material can be directly contrasted with a virgin material, which would be a raw material not previously formed into an end product. Polyethylene terephthalate (PET) would be an example of a virgin material, while a water bottle would be an example of an article formed of PET that could be a recycled material or a material for recycling.

As used herein, the word "granule" is intended to mean a material that is shredded, chopped, cut, ground, or otherwise divided into discrete particles of a desired size (or range of sizes), as small as about 0.01 millimeters in diameter, for example. As such, the terms "granule" and "particle" may be used interchangeably herein. At sufficiently small particle sizes, "granules" according to the invention may have the appearance of a powder.

Granule size can vary depending upon the application and the desired physical and aesthetic properties of the product. Since the granules according to the invention can take on a variety of shapes and forms, granule size or particle size can be described in terms of the largest dimension of the granule. For granules that are substantially round in shape, the largest dimension may be the granule diameter. For granules that are formed by shredding, the granules may have somewhat of an elongated shape, and the larges dimension may be a length or a width. In particular embodiments, granules for use in the present invention are substantially round in shape when viewed with the naked eye. Thus, the dimensions disclosed herein may be particularly related to a particle or granule diameter.

In some embodiments, granules for use according to the invention can have a size up to about 20 mm, up to about 19 mm, up to about 18 mm, up to about 17 mm, up to about 16 mm, up to about 15 mm, up to about 14 mm, up to about 13 mm, up to about 12 mm, up to about 11 mm, or up to about 10 mm. In other embodiments, granules for use according to the invention can have a size of about 0.01 mm to about 20 mm, about 0.1 mm to about 18 mm, about 0.1 mm to about 15 mm, about 0.1 mm to about 12 mm, or about 0.5 mm to about 15 mm. In other embodiments, the granules can have a size of about 0.5 mm to about 12 mm, about 0.5 mm to about 10 mm, about 1 mm to about 12 mm, about 1 mm to about 10 mm, or about 2 mm to about 8 mm.

Preferably, the granule sizes are large enough to be visually distinguishable from one another when combined with the binder material, imparting to the combined materials a "grainy" or "chunky" appearance as opposed to a uniform appearance. This grainy or chunky appearance indicates to the consumer that the product is formed of recycled materials. Thus, portions of articles formed with the composition of the invention, as described more fully below, can be described as having a grained texture, as having a rough texture, or as having a porous texture. This is in contrast to a uniform texture, such as obtained in forming a shoe sole from a polymer melt.

In specific embodiments, the granulated material is specifically used without being melted, such as for use in a melt extrusion process or in a melt casting process. In further embodiments, the granulated material is a recycled material. In other embodiments, the material is recycled material that is specifically not combined with virgin materials. More specifically, the granulated recycled material is not melted and combined with virgin material and is not combined with virgin material that is melted. For example, an article formed of material X could be made using an amount of recycled material X and an amount of virgin material X, the two grades of material X being melted and combined and used to form the new article. This embodiment of the invention is preferred over such methods since it disposes of the need to combine recycled material with virgin material and disposes with the need to melt the recycled material to form a new product.

Although it is preferred to use only recycled materials to form the granules used in the invention, virgin materials, if available in a granular form, may be used in some embodiments. Even if virgin materials are used in specific embodiments, though, the granules are not melted for later extrusion or melt molding, but are used such that the materials remain in the granular form in the end product.

A wide variety of materials may be recycled and granulated for use according to the present invention. In some embodiments, any polymeric material that may be turned into a granular form may be used. In specific embodiments, the material to be recycled and granulated is a material that is useful in forming a wear surface. As used herein, the phrase "wear surface" or "outer wear surface" means a surface that is exposed and subject to repeated contact of a type that may cause a wearing away of the surface due to frictional forces. The phrase "outer wear surface" may particularly be used in relation to an article of clothing, such as footwear, having an inner wear surface that is exposed to repeated contact with the body of the wearer. By contrast, the outer wear surface would be a surface on the external surface of the article that may come into contact with an item external to the body. One example of an outer wear surface is the outsole of a shoe that repeatedly contacts the ground, sidewalks, roadways, and the like. Of course, other outer surfaces of a shoe could also be an outer wear surface, such as a shoe upper, which is subject to scuffing, or the like. An example of a wear surface is the exposed surface of a walking or running track.

One particular example of a material that may be recycled and granulated for use according to the invention is rubber. Any material classifiable as a rubber material may be used in the invention, including natural rubber and synthetic rubbers, such as polyurethane rubbers, butadiene rubber (BR), styrene-butadiene rubber (SBR), chloroprene rubber (CR), or ethylene-propylene-diene rubber (EPDM). Vulcanized rubber may particularly be used. In specific embodiments, the material is recycled tire rubber. Disposal of worn or damaged tires is an ongoing problem, and such materials are a particularly useful source of granulated materials for use in the present invention. Recycled tire rubber is a presently available commodity and is made available through processes that strip the tires of all non-rubber components and chop and/or grind the rubber to defined specifications. For example, recycled tire rubber powder is available from Fangda Universal Environmental Protection Technology. Other non-limiting examples of types of rubber that could be used in the present invention include acrylic rubber, butyl rubber, chlorinated polyethylene, epichlorohydrin, ethylene propylene rubber, hydrogenated nitrile rubber, perfluoro elastomers, polynorbornene rubber, chlorobutyl, chlorosulfonated polyethylene, ethylene acrylic, fluoroelastomers, isoprene rubber, nitrile rubber, polychloroprene, polysulfide rubber, silicone rubber, fluorosilicone rubber, and tetra-fluoroethylene/propylene.

Other types of polymeric materials may also be recycled as granules for use according to the invention, including various thermoplastic and elastomeric materials. Preferably, the materials, when in the granular, provide some degree of elastomeric-type properties. Non limiting examples of further materials that may be used include ethylene-vinyl acetate, polyethylene foam, and polyurethane foam. Still further, non polymeric materials may also be used. For example, leather could also be recycled and turned into particles for use according to the invention. Moreover, various types of textiles could be used in the invention, particularly in the formation of footwear. Of course, any combination of granules of different types of materials, different shapes, and/or different sizes may be used according to the invention.

In some embodiments, more than one granulated material may be used, such as to from an article with each distinct granulated material forming a distinct region of the article. For example, a first region of the article may comprise a first granulated material, and a second region of the article may comprise a second granulated material. The first granulated material may be the same or a different material from the second granulated material. Similarly, the first granulated material may have a grain size or particle shape that is the same or different from the grain size or particle shape of the second granulated material. Such combination in the same article of a plurality of distinct regions each comprising one or more granulated materials having characteristics or properties that are the same or different from the characteristics or properties of one or more granulated materials forming another region are not limited to the examples given here. Other possibilities will be apparent to one of ordinary skill in the art.

In further embodiments, granules used in preparing articles may be uniformly sized or may be mixed sizes. In one embodiment, granules may be sieved to isolate granules having a specific size or size range, and only granules in the desired size range may be used in preparing an article. In another embodiment, granules of significantly different sizes may be mixed together in a random mixture. Granules of significantly different sizes may include, but are not limited to, granules having an average size that differs by about 0.5 mm, about 1 mm, about 2 mm, about 3 mm, about 4 mm, about 5 mm, or even more. For example, it may be desirable to use a mixture of granules having an average size of about 1 mm and granules having an average size of about 5 mm. Further, the granules of significantly different sizes may be combined in specific ratios. Such combinations may be particularly useful to impart specific desirable physical properties and/or specific desirable aesthetic characteristics. For example, in some embodiments, a very grainy or chunky look may be desired, and granules having an average size of about 5 mm may be particularly useful for achieving this look. In other embodiments, a smoother appearance may be desired, and granules having an average size of about 0.1 mm may be particularly useful for achieving this look.

The present disclosure describes the use of granulated materials in forming various articles of manufacture. In preferred embodiments, the materials are recycled materials, and the granulated materials may thus be referred to as granulated recycled materials. While the use of recycled materials is preferred, virgin materials may be used in certain embodiments. In specific embodiments, the granules used according to the invention comprise at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, or at least about 99% by volume recycled material. In some embodiments, 100% by volume of the granules used are from recycled materials. In specific embodiments, as more fully described below, an article of manufacture according to the invention may be formed substantially completely of recycled materials, and the granules may comprise only a portion of the recycled materials used.

To form an article of manufacture according to the present invention, the granulated material can be combined with a binder material. A "binder" according to the present invention is understood to refer to a material having an adhesive property sufficient to bind together a plurality of granules, as described herein, to form a cohesive, unitary structure. Preferably, the binder is useful to attach together the plurality of granules in a manner such that individual granules are not easily disassociated from the article as a whole.

In certain embodiments, the binder can comprise materials, such as polyurethane, latex, silicone, and even thermoplastic binders and water-based binders. In a preferred embodiment, the binder comprises a moisture cure, single component polyurethane, although two component polyurethanes could also be used. Of course, a variety of combinations of binders could be used in the invention.

Compositions according to the invention formed using a combination of granulated materials and binder materials can particularly be characterized by the ability to form a structurally cohesive and structurally sound mass of bound particles using only a relatively small amount of binder material. In one aspect, the invention provides compositions comprising a combination of granulated materials as described herein and a binder material as described herein. Surprisingly, a composition formed of granules and binder as described herein can be characterized by its relatively light mass. Granules formed from certain materials, such as EVA, can have an especially low mass per unit volume. Accordingly, to make a meaningful disclosure of the component parts of the inventive compositions and articles formed therefrom, the compositions may be described herein in terms of a volume basis.

In particular embodiments, a composition according to the invention may comprise up to about 30% by volume, up to about 25%, up to about 22%, or up to about 20% by volume of the binder material based on the overall volume of the composition. In further embodiments, the composition may comprise about 1% to about 30% by volume of the binder material, based on the overall volume of the composition. In further embodiments, the composition may comprise about 2% to about 28% by volume, about 2% to about 25% by volume, about 2% to about 22% by volume, about 3% to about 20% by volume, about 1% to about 28% by volume, about 1% to about 25% by volume, about 1% to about 22% by volume, about 5% to about 25% by volume, about 5% to about 20% by volume, about 5% to about 15% by volume, about 10% to about 25% by volume, about 10% to about 20% by volume, or about 15% to about 25% by volume of the binder material. In preferred embodiments, the binder material comprises a sufficiently small volume percentage of the composition so as to not be visible in a finished product comprising the composition. In other words, the binder does not mask the granular look of the material formed using the granular material. The use of excessive binder material may be readily apparent as a layer of the binder formed on an exposed surface of an article formed using the inventive composition. For example, excess binder may form an opaque layer, or a surface residue. The use of an insufficient volume of binder is likewise apparent by the formed article being easily crumbled (i.e., ready disassociation of the bound granules).

In some embodiments, the binder material may be pigmented to provide a desired effect. In specific embodiments, the binder is essentially colorless, or may be opaque or transparent. The binder may further comprise additives, such as pigments, dyes, antioxidants, antimicrobials (e.g., N-butyl-1, 2-benzothiazlin-3-one, such as VANQUISH 100, available from Avecia), In some embodiments, a composition according to the invention comprising granules and binder can be characterized by its content of granules. Specifically, the composition may comprise at least about 50%, at least about 55%, at least about 60%, at least about 65%, at least about 70%, at least about 75%, at least about 80%, at least about 85%, or at least about 90% by volume granules.

The binder content can vary based upon the binder material and the granule material used in the composition. For example, when using a polyurethane binder, a lower overall binder volume can be used with rubber granules than with EVA granules.

In one embodiment, a composition according to the invention comprising EVA granules and a single component, moisture cure polyurethane binder can be formed by combining about 1 L of the EVA granules with about 0.2 L of the polyurethane binder.

The granules and binder used to prepare the inventive composition can be described based on a volume ratio. In some embodiments, the binder:granule volume ratio is about 0.05 to about 0.5, about 0.08 to about 0.45, about 0.1 to about 0.4, about 0.15 to about 0.3, or about 0.15 to about 0.25.

In preferred embodiments, polyurethane binders may be used. The polyurethane binder may be a "moisture" or "air" cure material. As noted previously, single component polyurethane binders are particularly beneficial. The use of a single component binder rather than a multiple component binder not only reduces processing complexity and cost, but also results in more uniform combination of the binder material with the granulated recycled material.

Polyurethanes are generally understood to be the product of the chemical reaction between a polyisocyanate compound and a polyfunctional alcohol (i.e., a polyol). One example of a general reaction scheme for preparing a polyurethane compound is shown below:

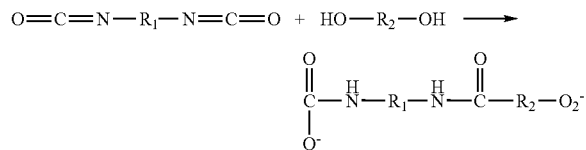

wherein $R_1$ and $R_2$ can be various organic groups including, but not limited to, optionally substituted straight or branched chain or cyclic alkyl, alkenyl, or alkynyl groups, as well as various aryl groups. Of course, the above scheme is provided only as an example of the preparation of the polyurethane compounds useful according to the invention and is not intended to be limiting thereof.

Non-limiting examples of organic polyisocyanates which may be used in the present invention include any of the aliphatic, cycloaliphatic, araliphatic or aromatic polyisocyanates known to those skilled in the art, especially those that are liquid at room temperature. Specific examples of suitable polyisocyanates include 1,6-hexamethylene diisocyanate, isophorone diisocyanate, 1,4-cyclohexane diisocyanate, 4,4'-dicyclohexylmethane diisocyanate, 1,5-naphthylene diisocyanate, 1,4-xylylene diisocyanate, 1,4-phenylene diisocyanate, 2,4-toluene diisocyanate, 2,6-toluene diisocyanate, and the diphenylmethane diisocyanates ("MDI"), including 4,4'-diphenylmethane diisocyanate, (4,4'-MDI), 2,4'-diphenyl methane diisocyanate (2,4'-MDI), 2,2'-diphenyl methane diisocyanate (2,2'-MDI), and polymethylene polyphenylene polyisocyanates (polymeric MDI) and the like. Mixtures of these polyisocyanates can also be used. Moreover, polyisocyanate variants, i.e., polyisocyanates, especially MDI's, that have been modified in a known manner by the introduction of urethane, allophanate, urea, biuret, carbodiimide, uretonimine, isocyanurate, and/or oxazolidone residues can also be used in the present systems (hereinafter referred to as "MDI variants" or "modified MDI"). These modified polyisocyanates may be prepared by reactions, such as using carbodiimide-promoting catalysts in the polyisocyanate composition to convert the isocyanate to the carbodiimide at temperatures ranging from 50° C. to 250° C., which then proceeds to react with further unconverted polyisocyanates at room temperature to form a uretonimine-modified polyisocyanate. Typical catalysts useful in this conversion to the uretonimine-carbodiimide modified polyisocyanates include phospholene-1-oxides and 1-sulfides, diaza and axaza-phospholanes and phosphorinanes, triaryl arsines and trialkyl phosphates.

Non-limiting examples of polyether polyols which may be used according to the invention include the products obtained by the polymerization of ethylene oxide with another cyclic oxide, for example, propylene oxide in the presence of polyfunctional initiators. Suitable initiator compounds contain a plurality of active hydrogen atoms and include water and low molecular weight polyols, for example, ethylene glycol, propylene glycol, diethylene glycol, dipropylene glycol, cyclohexane dimethanol, resorcinol, bisphenol A, glycerol, trimethylolopropane, 1,2,6-hexantriol, pentaerythritol and the like. Mixtures of initiators and/or cyclic oxide may be used.

In specific embodiments, a binder useful according to the present invention may comprise a moisture-cure polyurethane derived from a methylene diphenyl diisocyanate and a polyether based polyol. One example of a specific polyurethane that may be useful according to the invention is the composition designated MG03-7802 (available from Beynon Sports Surfaces, Hunt Valley, Md.). Non-limiting examples of other moisture-cure polyurethanes that may be useful according to the invention include BEYPUR® 300, BEYPUR® 310, BEYPUR® 320, BEYPUR® 340, BEYPUR® 345, and BEYPUR® 360. In some embodiments, a binder useful in the invention may comprise a single component, moisture cure, aliphatic-based polyurethane or a single component, moisture cure, aromatic-based polyurethane (e.g., an aromatic, polyether-based prepolymer).

In still further embodiments, a binder useful according to the invention may be described in terms of its various physical properties. In certain embodiments, the binder may be a material having a viscosity at 25° C. in the range of about 1,000 to about 7,000 cps, about 2,000 to about 6,000 cps, about 2,500 to about 5,500 cps, about 3,000 to about 5,000 cps, about 3,100 to about 4,900 cps, about 3,200 to about 4,800 cps, about 3,300 to about 4,700 cps, about 3,400 to about 4,600 cps, or about 3,500 to about 4,500 cps. In other embodiments, the binder has a viscosity of at least about 1,000 cps, at least about 1,500 cps, at least about 2,000 cps, at least about 2,500 cps, at least about 3,000 cps, or at least about 3,500 cps.

In certain embodiments, the binder may be a material having a curing time at 25° C. and 50% relative humidity in the range of about 1 hour to about 10 hours, about 2 hours to about 9 hours, about 3 hours to about 8 hours, about 4 hours to about 7 hours, or about 5 hours to about 6 hours. Cure time may be evaluated as further described herein.

In other embodiments, the binder may be a material having a Shore A hardness in the range of about 20 to about 100, about 30 to about 90, about 40 to about 80, or about 50 to about 70. In other embodiments, the binder may have a Shore A hardness of at least about 10, at least about 20, or at least about 30. In still other embodiment, the binder may have a Shore A hardness of less than about 120, less than about 110, less than about 100, or less than about 90. Shore A hardness may be evaluated on a cured sample of the binder alone using a durometer according to ASTM D2240.

In yet further embodiments, the binder may be a material having an elongation of about 150% to about 700%, about 200% to about 650%, about 250% to about 600%, about 300% to about 550%, about 350% to about 500%, or 400% to about 500%. Elongation may be evaluated on a cured sample of the binder (e.g., a thin film) alone according to ASTM D 3574.

In still further embodiments, the binder may be a material having a tensile strength of about 1,000 to about 1,600 psi, about 1,050 to about 1,550 psi, about 1,100 psi to about 1,500 psi, about 1,150 psi to about 1,450 psi, or about 1,200 psi to about 1,400 psi. In other embodiments, the binder may have a tensile strength of at least about 900 psi, at least about 1,000 psi, at least about 1,050 psi, at least about 1,100 psi, at least about 1,150 psi, or at least about 1,200 psi. Tensile strength may be evaluated on a cured sample of the binder (e.g., a thin film) alone according to ASTM D 3574.

In some embodiments, more than one binder material may be used. For example, the composition comprising the granules and the binder may be used to form a particular article of manufacture having a first region and a second region. The first region may comprise granules joined together by a first binder material, and the second region may comprise granules joined together by a second binder material. The first and second binder materials may be the same or different. Moreover, the weight percent of the first binder material in the first region may be the same or different from the weight percent of the second binder material in the second region. Such combinations in the same article of a plurality of distinct regions each comprising one or more binder materials having characteristics or properties that are the same as or different from the characteristics or properties of one or more binder materials in another region are not limited to the examples given here. Other possibilities will be apparent to one of ordinary skill in the art.

A composition according to the invention comprising a granulated material and a binder material may be used in a variety of ways. In particular, the composition may be used to form all or part of a number of articles of manufacture. The compositions of the invention exhibit such diversity in light of the particular combination of the materials. Specifically, in certain embodiments, the granulated material and the binder material may be combined so that each granule is at least substantially coated with binder material. The phrase "at least substantially coated" indicates that at least substantially all of the granules or particles are at least partially, and preferably completely, surrounded by a thin film of the binder material. This thin film coats the exterior surfaces of the granules so that the irregularity in shape of the granules does not prohibit proper binding between the granules. The granules are at least substantially coated when at least substantially all of the granules or particles have at least some degree of coating by the binder material. As more fully described below, the composition of the invention can be formed using a mixing technique to properly coat the individual particles with the binder material prior to forming any articles of manufacture using the composition.

The composition of the invention comprising a combination of the granulated material and the binder material can be used to form virtually any molded article of manufacture, as well as any product, such as a sheet, that may be formed by spraying or otherwise placing the combined materials onto a substrate. For example, in some embodiments, the article may be a surface such as a running track, playground, or mat. In other embodiments, the product may be a building or landscaping material, such as a tie, log, or the like. In still other embodiments, the product may be a consumer good. In preferred embodiments, the article is an article of clothing, particularly footwear, more particularly a shoe, specifically an athletic shoe, a running shoe, a walking shoe, a jogging shoe, a hiking shoe, a cross-training shoe, a casual shoe, or a dress shoe. In some embodiments, the composition of the invention may comprise substantially completely the entire article of manufacture. In other embodiments, the composition may comprise only a portion of the article. For example, as more fully described below, the composition may comprise a portion of a shoe, such as the outsole of the shoe. An article of manufacture according to the invention may comprise a single type of granulated material or a plurality of different types of granulated materials. Likewise, an article of manufacture according to the invention may comprise a single type of binder or a plurality of different types of binders. In certain embodiments, an article of manufacture according to the invention may be formed of any combination of granulated material(s) and binder(s) as described herein, including a single layer of an inventive composition as described herein or a plurality of layers of inventive compositions as described herein.

As previously pointed out, in some embodiments, an article according to the invention may comprise a plurality of regions, where each region has different characteristics and properties from other regions. For example, polyurethane foam provides superior cushioning ability (i.e., resilience). Ethylene vinyl acetate is a light and strong material. The combination polyurethane foam with ethylene-vinyl acetate results in a low mass, high strength article that also provides excellent cushioning properties.

In particular embodiments, the present invention is directed to footwear, which are generally referred herein as shoes. In one embodiment, the invention is directed to a shoe comprising an outer wear surface and having at least a portion of the outer wear surface formed of a composition according to the invention. In other words, the outer wear surface comprises at least one portion formed of a composition comprising a granulated material and a binder material. Preferably, the granulated material comprises a recycled material. Further, preferably, the granules are joined together by the binder to form a cohesive element. In specific embodiments, the outer wear surface is any surface that routinely comes into contact with the ground (or other walking or running surface) when the shoe is worn and used. Such an outer wear surface may comprise an outsole. Such an outer wear surface may also comprise a shoe upper. As used herein, a shoe upper is understood to mean the portion of a shoe that partially or completely covers the upper and side surfaces of a wearer's foot and is a portion of the shoe that is not interposed between the bottom of the wearer's foot and a walking surface. Of course, the use of the composition of the invention is not limited only to an outer wear surface. Rather, practically any portion of a piece of footwear may be formed using the composition comprising a granulated material and a binder material. For example, the composition may be used to form an outsole, a midsole, an insole, an upper, or combinations thereof. Indeed, the composition may be used to form virtually any shoe component or portion thereof. Still further, while the invention may be further described in terms of a shoe component, the invention is by no means limited to a shoe component.

In a specific embodiment, an outer wear surface formed using the composition of the invention is a shoe sole. As used herein, the term "sole" in relation to a shoe is intended to encompass any portion of a shoe that is interposed between the bottom of the foot of a wearer and a surface upon which the wearer may walk. Thus, a sole may be only a thin layer comprising only a single element or composition or may be a combination of elements, layers, and/or materials. The shoe sole may particularly comprise an outsole. In another embodiment, the shoe sole may comprise a midsole. In yet a further embodiment, the shoe sole may comprise an insole. In particular embodiments, the shoe sole may comprise an outsole and a midsole, may comprise an outsole and an insole, or may comprise an outsole, a midsole, and an insole. Specifically, the outsole can form an outer wear surface of the shoe, and the midsole and/or the insole can be internal to the outsole.

Numerous conformations are possible according to the invention. For example, the invention may provide a shoe having an outsole, and optional midsole, and an optional insole, and one, two, or all three of the outsole, midsole, and insole can be formed of a composition according to the invention. In specific embodiments, the invention provides a shoe comprising an outsole and a midsole, wherein the outsole and the midsole are formed of a composition according to the invention. In such embodiments, the outsole and midsole can comprise the same or different granules and the same or different binders.

In specific embodiments, an outsole and midsole both can be formed using a granulated material and a binder material. The outsole and midsole can particularly be joined together, such as by bonding. Such joining can arise from the binder used in the midsole, the binder used in the outsole, or both binder materials. Accordingly, in specific embodiments, the present invention provides a unitary shoe midsole and outsole. The article is "unitary" in that the midsole and the outsole can comprise different materials, but they are formed to be joined together to form a single, unitary structure (i.e., the outsole and midsole cannot be separated without destroying one or both of the midsole and outsole). In a preferred embodiment, the midsole and outsole can be bonded together, which may include being integrally bonded, meaning that that the components of the outsole and the midsole actually blend together at the interface such that granules and/or binder from the outsole physically blend with at least a portion of the granules and/or binder from the midsole.

In further embodiments, an outer wear surface formed using the composition of the invention can be a shoe upper. These embodiments can also be combined with embodiments wherein the shoe sole comprises a composition according to the invention. Particularly, the invention encompasses footwear wherein any combination of an upper, an insole, a midsole, and an outsole comprise a composition according to the invention comprising a granulated material and a binder material. In one specific embodiment, a shoe according to the invention comprises a sole wherein the midsole and the outsole are both formed of a composition according to the invention. Specifically, the outsole is formed using a polyurethane binder and granules of a rubber (preferably recycled rubber, such as from recycled tires), and the midsole is formed using a polyurethane binder and granules of ethylene vinyl acetate (such a formed by granulation of previously formed EVA shoe soles).

Of course, the components of a shoe according to the invention that can be formed from the inventive granule/binder composition are not limited to only an outer wear surface. For example, as previously described, a shoe midsole could be formed of the granule/binder composition. Likewise, a shoe insole may be formed of the granule/binder composition. The inventive granule/binder composition provides physical properties making it particularly beneficial as a shoe insole, such as shock absorbing characteristics and rebound properties that can provide a spring-like effect for a wearer.

In some embodiments, the invention can be directed specifically to a shoe insole. Such insole can be provided separate from a shoe and could be provided to consumers for placement in existing shoes not formed according to the invention, thus providing to such shoes some of the beneficial properties of a shoe, as described herein. Particularly, a shoe insole according to the invention can comprise granules, as described herein, combined with a binder, as described herein. The shoe insoles can be formed to correlate to specific shoe sizes. The shoe insoles can have a thickness of about 0.5 mm to about 10 mm, about 1 mm to about 8 mm, or about 2 mm to about 6 mm.

Shoes according to the invention can comprise a number of different combinations of materials, including recycled materials, and including a composition as described herein. In one embodiment, a shoe according to the invention can comprise a sole comprising a granule/binder composition, as described herein. The sole can comprise an outsole formed of the granule/binder composition. The sole can alternately comprise an outsole formed of the inventive granule/binder composition and a midsole formed of a conventional material. The sole can still alternately comprise an outsole formed of a conventional material and a midsole formed of the inventive granule/binder composition. The sole can still alternately comprise an outsole formed of the inventive granule/binder composition and a midsole formed of the inventive granule/binder composition.

In another embodiment, a shoe according to the invention can comprise an upper formed of a conventional material and a sole, at least a portion of which is formed of a granule/binder composition as described herein. The sole may be attached to the upper by any means, such as adhesive bonding, stitching, or the like. The shoe upper may have attached thereto a bottom layer formed of a conventional material, and the sole may be attached to the bottom layer of the shoe upper. Such attachment could be, for example, by use of an adhesive, such as a heat activated adhesive. In such embodiments, the bottom layer of the shoe upper is preferably formed of a material that would not by itself be expected to function as a shoe sole.

In still another embodiment, a shoe according to the invention can comprise an upper that comprises a granule/binder composition as described herein. For example, the inventive granule/binder composition could be sprayed onto a liner material covering a last (a foot-shaped mold). The liner material could be formed of any useful material, including any textile material. In some embodiments, the liner material may be formed from a recycled material. For example, the liner could be formed of thread made from a recycled material. The liner could also be somewhat rigid. For example, the liner could be a shaped article that could itself be formed of a recycled material. Particularly, the inventive granule/binder composition could be formed into a sheet, which could be cut and shaped to form the basic shoe shape (e.g., the upper, optionally including a sole component), and various additions could be made to the shaped shoe, such as adding one or more additional sole components and/or coating with further recycled material. Alternately, the upper may be formed from a sheet stock material that has been coated with the inventive granule/binder composition. This coated sheet stock material could be cut and stitched, bonder, or the like, to form a shoe upper as would be done using a conventional material (e.g., leather). Such sheet stock material could itself be formed of leather or could be formed of a different material. Moreover, the sheet stock material could be formed of a recycled material.

In a further embodiment, a shoe according to the invention can be formed substantially completely from recycled materials. For example, the shoe can comprise a sole formed from a granule/binder composition as described herein and an upper comprising the inventive granule/binder composition applied to recycled material (such as a liner formed of threads formed from recycled material or a sheet stock material that is formed from a recycled material). Such shoe can further comprise an insole that is formed of the inventive granule/binder composition.

Although a shoe component as described above may be formed using substantially only the composition of the invention, the shoe component may also comprise further components. For example, in specific embodiments, a shoe sole according to the invention may further comprise a plug, shank, or component generally referred to as an insert. The insert is preferably a single, unitary piece that can be inserted into any portion of an inventive shoe sole during manufacture, as described below. Of course, multiple inserts could be used.

An insert for use in a shoe sole according to the invention may be any component added to the sole for the sake of imparting new or enhanced properties. The shoe insert may alternately be any component useful to generally reduce the amount of bound, granulated material that must be used to form the shoe sole. The insert may impart, for example, improved resilience, improved durability, reduced porosity, reduced density, reduced production cost, or other property.

Any material capable of achieving such purposes may be used according to the invention. For example, insert could comprise a solid piece of material (e.g., a polyethylene or polypropylene plug). The insert may also comprise a gas or liquid filled cavity, such as an air filled polyethylene or polypropylene bladder or celled compartment. The insert may also comprise a gel. Such inserts may be placed in defined locations of the shoe sole to provide the desired properties. For example, an insert may be placed in a position to substantially correspond to the arch of a wearer's arch, heel, mid-foot, toes, or the like. Combinations of inserts in different areas of the sole and/or formed of different materials may also be used.

In still further embodiments, the insert may provide certain aesthetic or identifying characteristics. For example, the insert could be some type of text or a logo. When inserted into an outsole, the text or logo insert would particularly be viewable on the external surface (i.e., the wear surface) of the outsole. Of course the use of an insert is not so limited. Rather, the insert may be within an insole, within a midsole, within an outsole, or in between one or more of the insole, midsole, and outsole. In some embodiments, an insert may be provided in a shoe upper.

In particular embodiments, an insert according to the invention may comprise a material useful to further the integrity of the shoe sole. The natural walking motion encompasses repeated flexion of the foot, particularly near the fore-foot. Although the foot is jointed to accommodate this flexion, conventional shoe soles have only a limited flexibility, and it is common for shoe soles to crack or tear from the stress of flexing thousands of times.

In one embodiment, the present invention particularly overcomes this problem through the use of an insert. For example, the insert may comprise a thermoplastic polyurethane (TPU), which is an elastomer that is fully thermoplastic. More so than any other thermoplastic elastomers, TPU can provide a considerable number of physical property combinations arising from its structure as a linear segmented block copolymer composed of hard segments and soft segments. The hard segment can be either aromatic or aliphatic (e.g., aromatic TPU's based on isocyanates such as MDI, or aliphatic TPU's based on isocyanates, such as H12-MDI). The soft segment can be, for example, a polyether or polyester type. TPU provides high resilience, good compression set, and resistance to impacts, abrasions, tears, weather, and even hydrocarbons. TPU offers flexibility without the use of plasticizers as well as a broad range of hardness's and high elasticity. TPU particularly provides high flex fatigue in light of its excellent elongation properties (on the order of 600-700% elongation). Moreover, since TPU has properties similar to the polyurethanes that may be used as a binder according to the invention, the TPU sheet readily adheres to the inventive composition.

A TPU insert may particularly be placed within a shoe sole according to the invention in the area of the fore-foot to resisting cracking or tearing of the sole due to continuous flexion. The insert can be a relatively thin sheet of TPU and can be placed vertically anywhere within the shoe sole. In some embodiments, wherein the sole comprises an outsole and a midsole, a TPU sheet may be placed between the midsole and the outsole. In particular embodiments, the TPU sheet may be formed from recycled TPU.

Articles formed using a composition according to the invention have the immediately evident "look" of being formed of recycled materials. This is a distinct aspect of the invention that arises from the use of recycled granulated material in the granular form, rather than being melted and otherwise formed. In addition to this unique visual appearance, articles according to the invention also exhibit a number of useful properties.

For example, shoe components prepared using the inventive composition exhibit a high degree of breathability. Shoes formed using polymeric materials as the outsole are typically designed to prevent movement of moisture through the shoe sole and into the shoe. This has the undesired effect, though, of likewise preventing movement of moisture (e.g., sweat) from inside the show away from the foot of the wearer. This also prevents free movement of air through the sole to assist in cooling the foot. Similarly, known shoe insoles are typically formed of closed-cell foams, which provide little to no breathability. Moreover, conventional shoe uppers are often formed using materials with low breathability. By contrast, the invention provides a highly breathable insole, midsole, outsole, shoe upper, or combination thereof. Thus the invention provides a large variety of unique shoe materials having maximum breathability. For example, a shoe according to the invention may comprise a highly breathable outsole, a highly breathable midsole, and a highly breathable insole, and/or a highly breathable upper.

Breathability of a material may be characterized in terms of the water vapor permeability of the material, which is the amount of water vapor a material will transfer through its structure in a specified time. Water vapor permeability may be evaluated according to BS EN ISO 20344: 2004 (6 & 6.8). This test is commonly used to characterize the ability of footwear and other clothing to allow for the removal of perspiration from a wearer's skin. In relation to shoes, the test is specifically normally used only in relation to the shoe uppers. This is because shoe soles are typically designed to have a very low water vapor permeability. The rationale is that the shoe sole should prevent transfer of water vapor so as to disallow movement of water or other liquid from outside the shoe to inside the shoe. Shoe soles according to the present invention, as otherwise described herein, may particularly depart from this accepted knowledge in the art. Rather, shoe soles according to the invention may particularly be prepared to have relatively high degree of water vapor permeability. This provides the desirable quality of allowing the foot to breathe, which increases cooling of the foot. Moreover, active removal of perspiration through the shoe sole can provide increased effectiveness over a breathable upper alone.

In particular embodiments, a shoe component according to the invention may provide a specific degree of water vapor permeability when measured according to BS EN ISO 20344: 2004 (6 & 6.8). The shoe component may be any component as described herein. In specific embodiments, the shoe component is a shoe sole, or may particularly be a shoe outsole, a shoe midsole, or a shoe insole. In certain embodiments, a shoe component according to the invention has a water vapor permeability of at least about 10 $mg/cm^2 \cdot h$, at least about 15 $mg/cm^2 \cdot h$, at least about 20 $mg/cm^2 \cdot h$, at least about 25 $mg/cm^2 \cdot h$, at least about 30 $mg/cm^2 \cdot h$, or at least about 35 $mg/cm^2 \cdot h$. In other embodiments, a shoe component according to the invention has a water vapor permeability in the range of about 20 $mg/cm^2 \cdot h$ to about 60 $mg/cm^2 \cdot h$, about 25 $mg/cm^2 \cdot h$ to about 55 $mg/cm^2 \cdot h$, or about 30 $mg/cm^2 \cdot h$ to about 50 $mg/cm^2 \cdot h$.

Breathability may also be characterized in terms of the water vapor coefficient, which may also be measured according to BS EN ISO 20344, as described above. In particular embodiments, a shoe component according to the invention has a water vapor coefficient of about 250 $mg/cm^2 \cdot h$ to about 350 $mg/cm^2 \cdot h$, about 260 $mg/cm^2 \cdot h$ to about 340 $mg/cm^2 \cdot h$, about 270 $mg/cm^2 \cdot h$ to about 330 $mg/cm^2 \cdot h$, or about 280 $mg/cm^2 \cdot h$ to about 320 $mg/cm^2 \cdot h$. In other embodiments, the water vapor coefficient is at least about 200 $mg/cm^2 \cdot h$, at least about 220 $mg/cm^2 \cdot h$, at least about 240 $mg/cm^2 \cdot h$, at least about 250 $mg/cm^2 \cdot h$, at least about 260 $mg/cm^2 \cdot h$, at least about 270 $mg/cm^2 \cdot h$, or at least about 280 $mg/cm^2 \cdot h$.

In certain embodiments, the use of the granulated material may be beneficial for providing increased comfort or even therapeutic properties, particularly in relation to a shoe sole. For example, compositions formed of ethylene vinyl acetate granules bound by polyurethane can actually provide a spring-like effect to the shoe sole. This is a physically noticeable effect, as wearers have commented that shoes having soles according to the invention actually add some degree of assist to the walking motion, as if the shoe itself is lessening the force of the foot against the ground and providing a "push" to the foot of the wearer. Although not wishing to be bound by theory, it is believed that each substantially coated granule acts as an independent, individual spring of sorts, losing and retaking its shape upon compression and relaxation. Such resilience is highly desirable for some products, such as the sole of an athletic or walking shoe or surfaces such as running tracks and playgrounds.

Resiliency may be defined as the ability of a material to recover or return to its original shape following compression. In specific relation to a shoe sole, resiliency can be the ability of the shoe sole to return to its original shape following maximum compression during initial foot strike impact against a surface (e.g., the ground or another walking or running surface). Resiliency may further be defined by the ability of the shoe sole to return to its original shape following toe off The term "toe off" is understood in the shoe art to relate to the natural gait of the foot during locomotion wherein the foot typically strikes the ground heel first, pressure shifts from the heel toward the toes, and the foot pushes away from the ground by pressing upward from the toe region. This pushing away from the ground through the toe region (i.e., propulsion) is referred to as "toe off".

Resiliency may be interchanged with terms, such as energy return or responsiveness. Qualities of both material characteristics are typically sought by shoe developers since both yield beneficial results. If a shoe sole is too rigid (e.g., akin to walking or running barefoot on concrete), little shock absorption will be obtained, and the muscles, tendons, and bones are more susceptible to impact related injury. If the shoe sole is too giving (e.g., akin to walking or running barefoot on sand), the muscles and tendons become quickly fatigued, which can result in an overuse injury. Thus, resiliency can be evaluated using two methods.

ASTM F1614 is the standard test method for shock attenuating properties of materials systems for athletic shoes. ASTM F9 is the standard test method for flexibility of running shoes. Preferably, a shoe sole provides a balance between shock absorption resiliency during impact and optimal energy return during propulsion.

Shoe sole resiliency in typical running shoes is achieved through the use of continuous polymeric soles (i.e., formed from an extruded or molded polymeric melt). Accordingly, a skilled person would not expect shoe soles formed of bound, granulated materials to exhibit resiliency properties meeting or exceeding those of typical shoe soles. According to the present invention, however, it has been found that by ensuring that the individual granules are coated with the binder material, each of the individual coated particles provides a spring-like effect that allows the overall shoe sole to provide the desired resiliency characteristics. A shoe sole according to the present invention provides excellent resiliency while still providing a very comfortable, soft feel (i.e., a relatively low degree of hardness).

Shoe soles must be well constructed to withstand not only the frictional wearing away of surface material through repeated contact with a walking surface, but also to withstand the repeated flexure of the foot in the walking motion. Shoe soles are thus typically constructed of materials providing good flex fatigue and resistance to tearing or breaking in a flex zone. Such materials are often polymeric materials that are melt formed to provide a solid sole. Conventional knowledge in the field requires a shoe sole formed of a continuous piece of material. One would expect that a shoe sole formed of many discrete particles bound together would suffer from poor flex fatigue.

In certain embodiments, the present invention provides a shoe sole that comprises a plurality of granules bound together using a binder material. Surprisingly, the shoe sole exhibits excellent flex fatigue. In specific embodiments, the inventive shoe sole may include an insert material designed to further improve the good flex fatigue of the inventive shoe sole. In particular, the insert may comprise a sheet, film, or layer of a thermoplastic material, such as TPU. The insert is preferably positioned within the shoe sole in an area subjected to repeated flexure, such as the forefoot area. In particular embodiments, the shoe sole may comprise a plurality of layers (e.g., a midsole and an outsole), and the insert may be positioned between the layers.

Out-soles of footwear or other flexing components may suffer cracking due to flexing in use. Cracks may develop at points of high surface strain resulting from multiple factors, such as the design of the sole pattern or the flex of the wearer's foot. Such cracking will often occur without there being any cuts in the shoe sole (such as due to grit etc.) to initiate them.

Resistance to flex fatigue (in other words, determining whether a shoe sole exhibits good or improved flex fatigue properties) can be evaluated using a standard test, such as the Bata Belt Flex test, as described in "Physical Test Method", published by SATRA Footwear Technology Center, February 1989, pp. 1-9, the contents of which are incorporated herein by reference. The sample is placed on a belt flexing machine manufactured by Satra Footwear Technology Center, Kettering North-Hamptonshire, England which subjects the forefoot of the sole to flexing stress. Thus, this test measures the ability of a shoe sole to withstand cracking as a result of the thousands of cycles of bending to which a shoe sole is subjected.

Belt flex tester machines are designed to flex complete soles with their patterns intact in a way similar to flexing in actual use. Tests carried out using a belt tester provide a guide to the risk of such cracks developing during use.

Test specimens typically are attached to the outside of a continuous belt, which is driven around two rollers. One roller drives the belt, while movement of the belt round the other roller provides the main flexing action. The radius of the non-driving roller is chosen to make the flexing either more severe or less severe than in actual use.

This form of flexing also copies the wear conditions at each step as it produces a short period of rapid flexing followed by a longer period when the specimen is not being flexed. A normal test may consist of a number of flexing runs up to a total of 50,000 flexes, with an examination for cracking at the end of each run.

One such mechanism, the PROLIFIC Belt Flex Tester, consists of two rollers on which a flat belt moves. The larger roller, which is the driving roller, rotates at a desired speed with the help of an electric motor and V-belt arrangement to give the specified frequency of flexing. The second roller, which is the flexing roller, rotates with the movement of the belt.

Preferably, a shoe sole according to the present invention passes the Beta Belt Flex test. As used herein, it is understood that a shoe sole is deemed to pass the Beta Belt Flex test if the shoe sole does not break or does not completely break. In certain embodiments, passing the Bata Belt Flex test means the shoe sole completes at least 5,000 cycles without breaking In other embodiments, a shoe sole according to the invention completes at least 10,000 cycles, at least 15,000 cycles, at least 20,000 cycles, at least 25,000 cycles, at least 30,000 cycles, at least 35,000 cycles, at least 40,000 cycles, at least 45,000 cycles, or at least 50,000 cycles without breaking In other embodiments, a shoe sole is deemed to pass the Beta Belt Flex test if the shoe sole completes the above-noted number of cycles exhibiting only limited breaking but without completely breaking. As used herein, limited breaking means the sole may have a break or crack that does not extend across the entire width of the shoe sole and does not extend through the entire thickness of the shoe sole, and completely breaking means the shoe sole has at least one continuous crack extending across the entire width of the shoe sole and/or extending through the entire thickness of the sole.

The present invention also provides for customizing footwear (or other articles) to exhibit particularly desired properties. In particular, the composition used to form a single portion of an article (such as the outsole of a shoe) can be customized to combine specific types of granulated recycled material (e.g., rubber or ethylene vinyl acetate) with a specific type of binder such that the resulting shoe outsole exhibits specific properties. The specific properties could be changed by changing the type of granulated recycled material used, by using a mix of different types of granulated recycled materials, or by using a different binder. In other embodiments, specific properties can be achieved by using specific combinations of granulated recycled materials and binders in different regions of a single layer of an article (e.g., discrete regions of an outsole or discrete regions of a midsole) or in adjacent layers in an article (e.g., in a midsole adjacent an outsole). Such combinations could, for example provide superior resiliency or other improved properties such as hardness and elasticity.

In another aspect, the invention provides methods for preparing a great variety of articles of manufacture. For example, the inventive methods could be used to form resilient sheet materials that could be further used to from a variety of articles of manufacture. Generally, the inventive method could be used to form any article that may be formed by placing the combined materials onto a substrate or into a mold. The methods of the invention are particularly useful for preparing footwear.

In some embodiments, a method according to the invention comprises providing a granulated material as described herein and providing a binder material as described herein. Of course, it is understood that the granulated material can comprise a plurality of different types of materials that are mixed together or are provided separately to form discrete portions of the intended article. Likewise, the binder material can comprise a plurality of different binders. Both the granulated material and the binder material can be provided in the form ready for combination. In some embodiments, the method may comprise forming the granulated material. For example, granules of a recycled material may be formed by placing the materials to be recycled for use into a grinding machine, such as a machine using rotating blades to grind or cut the material into granules. The machine may include a particle sizing component to allow correctly sized particles to exit the machine while larger particles continue to be ground. Further, vacuum means may be used to facilitate movement of correctly sized particles out of the grinding machine.

The method also comprises combining a granulated material with a binder material. Preferably, the granulated material and the binder material are combined such that the binder material substantially completely coats the individual granules of the recycled material. This may particularly comprise mixing together the granules and the binder to form a homogeneous mixture. As used herein, a homogeneous mixture is intended to mean a mixture wherein the individual granules are coated with a thin layer of the binder material such that the mixture does not include excess binder that is not coated onto granules (i.e., puddles or pockets of free binder) and does not include excess granules that are not coated with binder (i.e., clumps of granules wherein the outer surface of the clump is coated with binder but granules within the clump are free of binder material). Preferably, mixing is continued at a rate and for a time sufficient to form a mixture that is at least 90% homogeneous, at least 95% homogeneous, at least 96% homogeneous, at least 97% homogeneous, at least 98% homogeneous, or at least 99% homogeneous. One of skill in the art viewing this disclosure would appreciate that forming a homogeneous mixture of the granules and binder is not simply a matter of processing choice but rather is a beneficial aspect of the inventive method that imparts beneficial properties to an article of manufacture prepared according to the invention. For example, one choosing to bind particles may choose to use an excess of binder and only a small content of granules, which would result in a mixture that include puddles of binder. Similarly, one may choose to fill a mold with granules and simply pour binder into the mold. Again, this would likely result in puddles of binder and/or clumps of granules. The inventive methods, however, forms a homogeneous mixture that is necessary to result in the beneficial properties described herein resulting from the synergistic actions of the binder coating the individual granules.

The granulated material and the binder material may be combined using a variety of methods. In one embodiment, the granulated material and the binder material are combined in an appropriate vessel with mixing, which can be by any useful means. In specific embodiments, the vessel may be lined with a very low surface tension thermoplastic such as polyethylene or polypropylene. This lining eliminates the need for solvents or other agents to clean the industrial mixer after mixing. Instead, the material remaining in the mixer may be easily removed after curing and then re-granulated to form an amount of granulated material for use in a subsequent practice of the invention.

The combined granulated material and binder material can be shaped to form the desired article of manufacture. In certain embodiments, the shaping step may comprise placing the combined materials in or on a mold to form an article having a shape corresponding to the shape of the cavity of the mold or to form an article having a shape corresponding to the shape of the exterior surface of the mold. As used herein, the term "placing" can encompass a variety of means, including but not limited to pouring, filling, packing, spraying, or the like. Moreover, a combination of means may be used to place the combined materials in or on the mold. In specific embodiments, it may be beneficial to use one means to place the material into a mold and to use a separate means to compress the combined materials (i.e., to more tightly pack the materials into the mold). Moreover, the degree to which the materials are packed into a mold (i.e., the pressure applied to pack the combined materials into the mold) can vary for different regions of the mold. In one embodiment, after the combined materials are placed in a mold or otherwise onto a substrate, the placed materials may be compressed by applying the appropriate pressure, which can be a simple as manually using a rolling pin. Of course, the invention encompasses the use of mechanized means to both place the combined materials into the mold and to apply any desired pressure to pack the materials into the mold. In yet another embodiment, the combined materials are sprayed onto a substrate using, for example, a pneumatic or pressurized spray gun system. In embodiments where inserts are used, the insert can be inserted into the mold prior to introduction of any of the combined granules and binder, during introduction of the combined granules and binder, or after introduction of the combined granules and bound.

The invention can be characterized by the ability to use low cost materials in forming the articles. Typical shoe production lines, for example, require the use of specialized molds to form outsoles and/or midsoles formed of polymer melts. Such molds can be expensive. Accordingly, to lessen the number of molds required, conventional shoe soles are often cured under accelerating conditions, such as using a chemical accelerant or a rapidly curing binder (e.g., two part polyurethane systems), which often tend to be environmentally unsound. Thus, conventional manufacturing relies on rapid turnover in the manufacturing process to limit the number of molds required. The present invention overcomes this problem.

In particular, since the granule/binder composition is not in the form of a melt, and since the combined materials may be shaped using very little force, molds used for forming articles of manufacture, such as shoes and shoe soles may be formed out of relatively inexpensive materials. Hundreds or even thousands of inexpensive molds may be used to achieve a sufficient output rate. In some embodiments, a mold useful according to the present can be formed of any non-wettable material. Wettability of a material is understood to refer to the contact angle between a droplet of a liquid in thermal equilibrium on a horizontal surface of the material. The wetting angle corresponds to the shape the droplet of liquid takes when contacting the surface (i.e., from remaining substantially in the droplet form to spreading out to form a film). When a surface is non-wettable to a liquid, the liquid remains in the droplet form and does not spread across the surface, which decreases binding between the liquid and the surface. Preferably, a non-wettable material, as used herein, is a material to which a binder as described herein does not readily adhere in a liquid state and any dried residue is readily removed. In particular, a non-wettable substrate is one where no solvent or separate mold release is needed to remove any cured binder material (with or without granulated material) from the mold.

In particular embodiments, a mold for use according to the invention can be a thermoformed mold, such as a thin plastic mold. Non-limiting examples of materials that may be used to form non-wettable molds according to the invention are polyethylene and polypropylene. Such molds may be formed from a sheet having a thickness of about 1 to about 10 mm, about 1 to about 5 mm, about 1 to about 3 mm, or about 1 to about 2 mm. The mold may be transparent, thus allowing the contents therein to be inspected for quality without removing the product from the mold.

The molds can also comprise multiple components. For example, the non-wettable mold could be placed over a support, which could be formed of a more durable material, such as a metal. Further, the molds could be formed to have specific shapes provided therein that are then imparted to the molded material (e.g., such as a specific logo or text). The mold could also comprise a cap component. Of course, in other embodiments, other materials may be used to form a mold according to the invention. For example, a mold could be formed of an epoxy material or of a metal, particularly a low weight metal, such as a aluminum.

After the composition is placed in or on a mold, the composition can be cured to form a product that is one or more of cushioning, durable, and attractive. As used herein, the word "curing" is intended to mean curing the one or more binder materials. Particularly, curing can comprise allowing the composition to remain undisturbed for a sufficient time and under sufficient conditions such that the granules become bound together by the binding action of the binder material. An article can be described as being cured when the individuals granules are sufficiently bound together to resist crumbling when handled. An article can also be described as being cured when the article is no longer tacky to the touch.

Curing time can depend upon the materials used and the curing conditions. In specific embodiments, curing is extended relative to curing of similar, typical items. As described above, shoe soles, for example, are often quickly cured (e.g., in a matter of seconds or minutes) to reduce the number of molds required for production. According to the present invention, curing requires a time of at least about 5 minutes at least about 10 minutes, at least about 20 minutes, at least about 30 minutes, at least about 40 minutes, at least about 50 minutes, at least about 60 minutes, at least about 90 minutes, or at least about 120 minutes. In other embodiments, curing requires a time of about 5 minutes to about 12 hours, about 10 minutes to about 12 hours, about 10 minutes to about 10 hours, about 10 minutes to about 8 hours, about 10 minutes to about 6 hours, about 10 minutes to about 4 hours, about 10 minutes to about 2 hours, about 10 minutes to about 90 minutes, about 10 minutes to about 60 minutes, about 20 minutes to about 90 minutes, about 20 minutes to about 60 minutes, or about 30 minutes to about 60 minutes.

In certain embodiments, curing can be carried out at ambient conditions (e.g., a temperature of about 18° C. to about 25° C.). For example, a shoe sole prepared using the inventive granule/binder composition can be fully cured in a time of about 8 to about 10 hours at ambient conditions. In some embodiments, however, curing time may be reduced by curing at an increased temperature. In specific embodiments, curing is carried out at a temperature of up to about 150° C., up to about 125° C., up to about 100° C., up to about 90° C., up to about 80° C., up to about 70° C., up to about 60° C., up to about 50° C., or up to about 40° C. In other embodiments, curing is carried out at a temperature of about 10° C. to about 150° C., about 20° C. to about 125° C., about 25° C. to about 110° C., about 25° C. to about 100° C., about 25° C. to about 90° C., about 25° C. to about 70° C., about 25° C. to about 60° C., or about 25° C. to about 50° C.

In specific embodiments, such as when the binder comprises a single component, moisture cure polyurethane material, curing may take place under specific conditions of humidity. For example, in some embodiments, curing is carried out at a relative humidity of at least 30%, at least 40%, at least 50%, at least 60%, at least 70%, at least 80%, or at least 85%. In other embodiments, curing is carried out at a relative humidity of about 30% to about 95%, about 40% to about 90%, about 50% to about 85%, about 50% to about 80%, or about 55% to about 75%.

The present invention can be characterized by its environmentally neutral curing methods. As noted above, curing of the binder used in preparing a composition according to the invention can be carried out at relatively low temperatures, which can be achieved through environmentally neutral methods. For example, articles according to the invention could be cured in a solar heated enclosure. This could be an active heating using solar panels to provide heat producing energy or could be a passive method using direct sunlight as the heat source (e.g., a "sun room"). In one embodiment, curing can be carried out in a solar heated room with a relative humidity of about 85% to about 95%.

In some embodiments, the composition of the invention can be formed using a binder that does not require the use of a chemical accelerant to modify the curing time of the binder. Thus, the present invention may be described such that the curing step is carried out in the express absence of a curing accelerant, particularly a chemical curing accelerant. In other embodiments, some content of accelerator may be used.

In specific embodiments, it may be useful to coat an article prepared according to the invention with an additional amount of the binder material. For example, when the article is a shoe sole, the sole may be prepared as described above. After curing and removal from the mold, the finished sole may be coated or otherwise covered with a layer of binder material. The additional layer of binder material may be applied by any means, such as spraying, brushing, rolling, dipping, or the like. Preferably, only a very thin layer of binder material is applied such that the binder only coats the very outer surface of the article and does not substantially penetrate into the pores of the article.

In specific embodiments, the present invention provides a method for preparing a shoe sole. In particular, the shoe sole comprises an outsole (i.e., an outer wear surface) and a midsole, each being formed using different granulated materials. The midsole can be formed of a first granulated material combined with a first binder, and the outsole can be formed of a second granulated material combined with a second binder. In some embodiments, the first and second binder may be identical. The midsole composition is formed by combining and mixing the first granulated material and the first binder, and the outsole composition is formed by combining and mixing the second granulated material and the second binder.

Preferably, in each composition, the respective granules are substantially completed coated with the respective binder material. The midsole composition is placed first into a shoe sole mold. In some embodiments, the midsole composition may be packed tightly around the perimeter of the mold and is packed less tightly in the interior of the mold. If desired, an insert may be placed in the mold prior to, during, or after placing the midsole composition into the mold. The midsole composition may then be distributed and leveled in the mold, such as by using a polyethylene or polypropylene rolling dowel. The top surface of the mold may act as a guide for the dowel to level off and pack the midsole uniformly. Next, the process can be repeated to form the outsole layer directly on top of the midsole layer. The outsole may be added at any stage of curing of the midsole. For example, the midsole could be completely cured prior to adding the outsole layer. In such an embodiment, the binder material in the outsole could be used to bind the outsole and the midsole together. Preferably, the outsole layer is provided prior to complete curing of the midsole layer. In such embodiments, both the midsole binder material and the outsole binder material may function to bind the outsole and midsole together. After addition of the outsole, the combined outsole and midsole can be cured to form the completed article of manufacture (i.e., the shoe sole comprising a unitary outsole and a midsole). This completed sole may be optionally coated with a thin layer of the binder material. The shoe sole can be attached to a shoe upper, such as by use of a heat activated adhesive.

The process of forming a unitary outsole and midsole significantly can reduce process time, labor, and required machinery. Known methods of forming a shoe outsole and midsole typically require separately molding the midsole and the rubber outsole, under very difficult and toxic conditions. After formation (usually by molding a rubber melt), the rubber outsole must undergo a costly (and sometimes toxic) process to prepare the outsole for bonding to the remainder of the shoe. For example, the outsole is trimmed (which produces large volumes of waste material), roughed (again producing waste and pollution), primed (often using hazardous chemicals), cemented, heated (requiring huge energy input), and carefully placed and pressed onto the midsole. In all, this "simple" bonding step is actually a labor intensive, expensive, and potentially dangerous process. The present invention can eliminate these laborious and expensive steps. In addition, the bonding between the outsole and midsole according to the invention can be even stronger and easier to achieve than the type of midsole/outsole bonding previously known. In particular, bonding of the outsole and midsole according to certain embodiments of the invention may occur throughout the entire midsole-outsole interface as the binder material is cured, rather than at select points through the application of adhesives and pressure. In other words, an integral, unitary structure can be formed.

Forming the outsole and midsole in a single process can result in the essential fusion of the two layers. This is particularly achieved in light of the homogeneous mixture of the granules and binders used in each layer. The granules substantially completely coated with binder allows for the individual granules to bond on all exterior surfaces. Thus, at the layer interface, each individual granule is equally bonded to the granules in its respective layer and to granules in the adjacent layer. Thus, the two layers can become intermixed at the interface.

The methods according to the invention provide a variety of benefits. For example, the relative long cure time according to the invention (on the scale of tens of minutes up to hours as opposed to only a few minutes) reduces the likelihood that the composition will "set up", or harden, prematurely. Further, the relatively long cure time need not cause production delays due to the ease with which the invention may be practiced on a large scale through the simultaneous use of hundreds or thousands of inexpensive molds. However, the cure time may be adjusted according to the requirements of a specific factory or industry, such as the footwear industry. For example, in one embodiment, curing may be carried out at 30% humidity and a temperature of 77° C. in a time of about 30-50 minutes.

In other embodiments, a method for preparing a shoe according to the invention may comprise placing a layer of a composition according to the invention of a surface of a shoe or a shoe part. For example, in one embodiment, the method may comprise providing a shoe comprising a conventional shoe sole, and spraying the inventive granule/binder composition onto at least a part of the shoe sole to form thereon a layer of the granule material. In another embodiment, the method may comprise providing a shoe comprising a conventional shoe upper (e.g., natural or artificial leather, canvas, or the like), and spraying the inventive granule/binder composition onto at least a part of the shoe upper to form thereon a layer of the granule material. Surprisingly, it has been found according to the invention that forming a layer of the inventive granule/binder material on a shoe upper can substantially increase the wear properties of the shoe. For example, hiking shoes are often subject to extreme wear conditions on the upper, and a layer of the inventive granule/binder composition on the upper protects the underlying material from premature wear or acute damage.

In further embodiments, a method for preparing a shoe according to the invention may comprise forming a sheet stock material that can be used in a conventional shoe making process. Shoe uppers are typically prepared by providing a sheet stock material (e.g., natural or artificial leather, canvas, or the like), cutting the stock material into defined shapes, and combining the cut pieces to form the shoe, particularly the shoe upper. According to the present invention, a sheet stock material can be coated with the inventive granule/binder composition to form a new sheet stock material having thereon a layer of the granule material. This new sheet stock material may then be subject to use in conventional shoe making methods.

In yet other embodiments, a method for preparing a shoe according to the invention may comprise the use of a foot shaped mold, or a last. In one embodiment, a last may be covered with a liner material, which may be any material useful as a shoe liner (e.g., textile made of natural or synthetic fibers or a shaped plastic liner). The liner may particularly be formed from fibers made of recycled materials. The inventive granule/binder material may then be coated onto the lined last, such as by spraying. The coating is allowed to cure, and the last can be removed leaving a formed shoe with a liner therein. This method may include formation of a shoe sole in combination with the shoe upper. Alternatively, a shoe sole may be formed separately and later attached to the formed shoe.

Further, the versatility and simplicity of the invention allow the production of complex articles of manufacture at low cost. The versatility of the invention is especially crucial in developing a very low cost start up manufacturing process. Not only does the invention permit the relatively inexpensive production of complex articles of manufacture, but also their environmentally-friendly production. For example, in one embodiment, virtually any scrap material left over from a manufacturing process such as footwear production may be shredded, chopped, cut, ground, or otherwise divided to form a granulated recycled material for use in the invention. In another embodiment, granulated leather, plastic, and polyurethane shoe components may be combined with more durable granulated rubber and binder material according to the invention to form the outer wear surface.

Other embodiments of the invention similarly reduce labor, energy, and environmental costs. For example, in some embodiments, the combined materials may be placed onto a substrate rather than into a mold. In one embodiment, the substrate may be a shoe mold covered with a sock, so that the invention provides a facile, single-step method to form an entire shoe. In particular, a composition according to the invention could be sprayed direction over the sock to form an entire shoe. In another embodiment, the substrate may be a previously formed shoe midsole or shoe upper. Moreover, combinations of methods may be used to form an article of manufacture, such as a shoe. All of the above embodiments, as well as others apparent to one skilled in the art, permit complex articles to be produced in a simple, versatile, and efficient manner, saving time, energy, and money, in addition to reducing environmental impact.

In a preferred embodiment, the lack of expensive equipment reduces energy costs and thus environmental impact as well. Only the granulating process and the combination of the granulated material with the binder material require direct energy input. Indeed, the invention beneficially requires only low energy consumption and only a relatively modest capital investment to begin production of articles formed by the method of the invention.

EXPERIMENTAL

The present invention is further illustrated by the following examples, which are set forth to illustrate various embodiments of the invention and are not to be construed as limiting thereof Example 1

Water Vapor Permeability Test

Two shoe soles were tested to determine the breathability of the sole in terms of water vapor permeability. Each sole was formed of low density PVA (i.e., having a density of about 0.2 g/cm$^3$). Test sole 1 was a continuous PVA sole, such as formed by extrusion or molding of a PVA melt. Test sole 2 was a sole according to the invention formed from particulate PVA and a binder material as described herein. Each test sole was evaluated according to BS EN ISO 20344 to determine the water vapor permeability of the sample.

Test sole 1 exhibited a water vapor permeability of 0.2 mg/cm$^2$·h with a degree of uncertainty of 0.16 mg/cm$^2$·h, with k=2.23 at 95% confidence level. Test sole 1 exhibited a water vapor coefficient of 2.1 mg/cm$^2$·h with a degree of uncertainty of 1.29 mg/cm$^2$·h, with k=2.22 at 95% confidence level.

Test sole 2 exhibited a water vapor permeability of 38.3 mg/cm$^2$·h with a degree of uncertainty of 0.16 mg/cm$^2$·h, with k=2.23 at 95% confidence level. Test sole 2 exhibited a water vapor coefficient of 308.1 mg/cm$^2$·h with a degree of uncertainty of 1.29 mg/cm$^2$·h, with k=2.22 at 95% confidence level.

As seen from the above test results, test sole 1 had almost no breathability—the nearly complete lack of water vapor permeability correlates to a nearly complete lack of air permeability as well. On the contrary, test sole 2 had a relatively high level of water vapor permeability, which correlates to a high level of air permeability, or breathability.

Example 2

Flex Fatigue Testing

Two shoe soles according to the invention were tested for flex fatigue using the Beta Belt Flex test. Each sole was formed of EVA granules and a binder as described herein. The test soles further included a TPU sheet insert in the forefoot area. The test soles were subjected to minimal cleaning with solvents so as to avoid compromising the integrity of the bound particles. Test sole 1 and test sole 2 each exhibited only limited breaking after completing 50,000 cycles. No complete breaking was exhibited.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the invention. Although specific terms are employed herein, they are used in a generic and descriptive sense only and not for purposes of limitation.

That which is claimed:

1. An article of manufacture comprising an outer wear surface having at least one portion of the outer wear surface formed of a composition comprising a recycled polymeric granulated material and a binder material, wherein:
   the recycled polymeric granulated material includes granules having a diameter ranging from 1 mm to 12 mm such that the granulated material remains in a granular form, and the outer wear surface is a portion of a shoe.

2. The article of claim 1, wherein the outer wear surface comprises at least a portion of a shoe upper or a shoe sole.

3. The article of claim 2, wherein the outer wear surface comprises a shoe sole, and wherein the shoe sole has a water vapor permeability of at least about 10 mg/cm$^2$·h when tested according to BS EN ISO 20344.

4. The article of claim 2, wherein the outer wear surface comprises a shoe sole, and wherein the shoe sole exhibits a flex fatigue such that the shoe sole passes the Beta Belt Flex test after 50,000 cycles.

5. The article of claim 2, wherein the outer wear surface comprises a shoe sole, and wherein the shoe sole comprises an anti-crack insert comprising a thermoplastic polyurethane material.

6. The shoe of claim 5, wherein the shoe sole comprises an outsole and a midsole, and wherein the anti-crack insert is positioned in an interface between the outsole and the midsole.

7. The article of claim 1, wherein the portion of the outer wear surface formed of the composition has a porous texture.

8. The article of claim 1, wherein the article comprises recycled granulated material comprising an ethylene vinyl acetate and a polyurethane binder having a binder to granule volume ratio ranging from 0.15 to 0.25.

9. The article of claim 1, wherein the recycled granulated material has a grain size of 2 mm to 8 mm.

10. The article of claim 1, wherein the binder material is selected from a group consisting of polyurethane, latex, silicone, a thermoplastic material, an aqueous binder composition, and combinations thereof.

11. The article of claim 1, wherein the binder comprises about 1% to about 30% by volume of the combined recycled granulated material and binder material.

12. The article of claim 1, wherein the volume ratio of the binder material to the recycled granulated material is about 0.05 to about 0.4.

13. The article of claim 1, wherein the article comprises:
   a first region comprising a first granulated material and a first binder material, the granules being joined together with the first binder material; and
   a second region comprising a second granulated material and a second binder material, the granules being joined together with the second binder material.

14. The article of claim 13, wherein at least one of the first granulated material and the second granulated material comprises a recycled material.

15. The article of claim 13, wherein the first and second binder materials are the same.

16. The article of claim 13, wherein the granulated material forming the first region is a different material from the granulated material forming the second region.

17. The article of claim 13, wherein the first binder material is different from the second binder material.

18. The article of claim 13, wherein the granulated material forming the first region has a grain size that is different from the grain size of the granulated material forming the second region.

19. The article of claim 13, wherein the first region comprises a midsole, and the second region comprises an outsole forming an outer wear surface.

20. The article of claim 19, wherein the midsole and outsole are joined together by the first binder material, the second binder material, or both the first and second binder materials.

21. The article of claim 19, wherein the midsole and outsole are joined to form a single, unitary structure.

22. The article of claim 19, wherein the granulated material forming the outsole comprises granulated rubber.

23. The article of claim 19, wherein the granulated material forming the midsole comprises ethylene vinyl acetate.

24. The article of claim 1, wherein the recycled granulated material is not melted.

25. The article of claim 1, wherein the binder material comprises a moisture cure, polyurethane binder.

26. The article of claim 1, wherein the outer wear surface comprises more than one type of granulated material each forming a distinct region thereof.

27. An article of manufacture comprising an outer wear surface having at least one portion of the outer wear surface formed of a composition comprising a recycled polymeric granulated material and a binder material, wherein:
   the recycled polymeric granulated material includes granules having a diameter ranging from 1 mm to 12 mm, and
   the recycled polymeric granulated material comprises an ethylene vinyl acetate and a polyurethane binder having a binder to granule volume ratio ranging from 0.15 to 0.25.

* * * * *